(12) United States Patent
Agrawal et al.

(10) Patent No.: US 12,670,692 B2
(45) Date of Patent: Jun. 30, 2026

(54) TRANSFER LEARNING BY DOWNSCALING AND UPSCALING

(71) Applicant: CALIPSA LIMITED, London (GB)

(72) Inventors: Siddarth Agrawal, London (GB);
Christopher Tegho, Chicago, IL (US);
Ashwin D'Cruz, London (GB); David Hall, Chicago (GB); Boris Ploix,
Cambridge, MA (US)

(73) Assignee: CALIPSA LIMITED, London (GB)

( * ) Notice: Subject to any disclaimer, the term of this patent is extended or adjusted under 35 U.S.C. 154(b) by 179 days.

(21) Appl. No.: 18/560,541

(22) PCT Filed: May 17, 2022

(86) PCT No.: PCT/GB2022/051237
§ 371 (c)(1),
(2) Date: Nov. 13, 2023

(87) PCT Pub. No.: WO2022/243671
PCT Pub. Date: Nov. 24, 2022

(65) Prior Publication Data
US 2024/0257492 A1 Aug. 1, 2024

(30) Foreign Application Priority Data
May 18, 2021 (GB) ..................................... 2107096

(51) Int. Cl.
*G06F 18/2413* (2023.01)
*G06T 3/40* (2006.01)
(Continued)

(52) U.S. Cl.
CPC ................ *G06V 10/70* (2022.01); *G06T 3/40* (2013.01); *G06V 20/40* (2022.01)

(58) Field of Classification Search
CPC ...... G06V 10/70; G06V 20/40; G06V 10/764;
G06V 10/774; G06V 30/19147;
(Continued)

(56) References Cited

U.S. PATENT DOCUMENTS

2018/0342044 A1 11/2018 Lutz et al.
2019/0034734 A1 1/2019 Yen et al.
(Continued)

OTHER PUBLICATIONS

Molina-Cabello, Miguel A., et al. "The effect of downsampling-upsampling strategy on foreground detection algorithms." Artificial Intelligence Review 53.7 (2020): 4935-4965. (Year: 2020).*
(Continued)

*Primary Examiner* — Andrew M Moyer
*Assistant Examiner* — Dylan John Mendez Muniz

(57) ABSTRACT

A method for transfer learning is provided. A first set of image data at a first resolution is received. Metadata, comprising object data, associated with the first set of image data is received. A second set of images having a second resolution is generated by downsampling the first set of image data. A third set of image data having a third resolution is generated by upscaling the second set of image data. The third set of image data is associated with the metadata associated to the first set of image data. A computer implemented model is trained to detect objects using the combination of the third set of image data and the associated metadata. A fourth set of image data at the third resolution is received. The trained computer implemented model is refined using the fourth set of image data.

14 Claims, 7 Drawing Sheets

Rescaled Images With Object
Metadata Retained
700

(51) Int. Cl.
    *G06V 10/70*       (2022.01)
    *G06V 10/764*     (2022.01)
    *G06V 20/40*       (2022.01)

(58) Field of Classification Search
    CPC ...... G06V 30/2504; G06V 20/46; G06T 3/40;
                               G06F 18/2413
    See application file for complete search history.

(56)                 References Cited

U.S. PATENT DOCUMENTS

2019/0102646 A1     4/2019   Redmon et al.
2020/0090305 A1     3/2020   El-Kamy et al.
2020/0160087 A1*   5/2020   Redmon ................ G06V 10/82

OTHER PUBLICATIONS

Didyk, Piotr, et al. "Perceptually-motivated real-time temporal upsampling of 3D content for high-refresh-rate displays." Computer Graphics Forum. vol. 29. No. 2. Oxford, UK: Blackwell Publishing Ltd, 2010. (Year: 2010).*

Bandoh, Yukihiro, et al. "Adaptive down-sampling of frame-rate for high frame-rate video." 2009 Picture Coding Symposium. IEEE, 2009. (Year: 2009).*

Mehmood, Faisal, et al. "Object detection mechanism based on deep learning algorithm using embedded IoT devices for smart home appliances control in CoT." Journal of Ambient Intelligence and Humanized Computing (2019): 1-17. (Year: 2019).*

The International Search Report and the Written Opinion, corresponding patent application No. PCT/GB2022/051237, filed: May 17, 2022, all pages.

* cited by examiner

Typical Security Camera System
100

Overview of Optimising a Trained Model
300

250   Preliminary Training Data

320   Automated Detection Model

330   Original Data from Third Resolution

340   Optimised Model

Objects Shown in Sequential Image
Frames with Bounding Boxes
400

TRANSFER LEARNING BY DOWNSCALING AND UPSCALING

FIELD

The present invention relates to generating training data for computer models, specifically video detections models, using transfer learning techniques. More particularly, the present invention relates to downsampling and upscaling substantially high quality training data for the training of a new computer model to be used as a video detection model.

BACKGROUND

Video surveillance is used on a large scale for security purposes and can be monitored by both security personnel and automated systems.

Due to the maturity of the technologies used, and in consequence the relatively low cost of installing video surveillance equipment, an increasing number of cameras are typically installed and ever-increasing amounts of video data by systems set up with multiple video cameras operating with varying specifications are therefore being generated for security purposes.

Newer versions of video cameras, usually with a different specification, are released by manufacturers frequently and are often incorporated by consumers into their existing video surveillance systems. Similarly, video cameras from different manufacturers are often used to expand or update existing video surveillance systems. However, these video cameras typically generate alarms with a different threshold and/or generate images with a different quality and resolution, so when incorporating them into an existing video surveillance system that harness automated detection systems for monitoring video surveillance footage, these automated systems will struggle to perform their desired function. Specifically, automated detection systems of existing video surveillance systems will not be able to adapt to any new video cameras being onboarded.

To provide accurate automated systems for monitoring video surveillance footage, sufficient and high quality training data is required. High quality training data would typically include relevant footage of security threats that have accurate labelling. However, fine tuning or updating existing automated systems in order to cater for any new video cameras requires the same amount of work as setting up a new automated detection system. Typically, even for fine tuning an existing automated detection system/model, at least 50,000 high quality images, but preferably over 100,000 high quality images, at the required resolution and quality for new video cameras is needed with associated labelled data. However, the generation of this amount of data is an expensive process which often requires many hours of skilled personnel, and in most cases, the initial set image data needed to train a model is not even available.

Thus, there is a need for generating additional data for automated detection systems to enable onboarding of new video cameras into existing video surveillance systems easily and efficiently.

SUMMARY OF INVENTION

Aspects and/or embodiments seek to provide a system and/or method of using transfer learning techniques to generate training data for a new computer models in security event detection methods and/or systems using image data from surveillance cameras as input data.

According to a first aspect, there is provided computer-implemented method for transfer learning, the method comprising: receiving a first set of image data, wherein the first set of image data comprises two or more sequential images at a first resolution; receiving metadata associated with each of the sequential images of the first set of image data, wherein the metadata comprises detected object data; generating a second set of image data by downsampling each of the sequential images of the first set of image data, wherein each of downsampled images of the second set of images has a second resolution; generating a third set of image data by upscaling each of the sequential images of the second set of image data wherein each of the upscaled images has a third resolution; associating each of the sequential images of the third set of image data to the metadata associated to each of the sequential images of the first set of image data; training a computer-implemented model using the combination of the third set of image data and the associated metadata, wherein the computer-implemented model is trained to detect objects in images; receiving a fourth set of image data, wherein the fourth set of image data comprises two or more sequential images at the third resolution; and refining the trained computer-implemented model using the fourth set of image data.

Generating training data by leveraging the reliability of proven training data which uses high quality image data can enable and allow for more efficient deployment of detection models for new video cameras operating with different specifications. By using the methods of transfer learning, cameras with a different and specifically lower resolution can be incorporated into existing video surveillance systems and be provided with automated detection models without needing large amounts of (manual or semi-automatic) labelled training data. It also enables the use of video detection systems to be deployed with a very small amount of real world data from a new camera that is only needed to optimise the trained model.

Optionally, the first set of image data comprises any one or any combination of: high resolution images; low-noise sequential images; images obtained from high-quality cameras. Optionally, the first set of image data further comprises at least one additional set of image data, wherein the at least one additional set of image data comprises: image data captured at different times; and/or image data captured at one or more different resolutions.

Using an initial set of training data which is based on high quality image data allows for these data sets to be downsampled and rescaled (or upscaled) without losing vast amounts of image quality and preserving the associated metadata. Using higher quality data as the initial dataset enables the creation of simulated lower quality training data.

Optionally, downsampling comprises any one or any combination of: downsampling by a fraction; one or more machine learning models; and one or more interpolation methods. Optionally, downsampling comprises downsampling to a target resolution.

Optionally, upscaling comprises any one or any combination of: one or more machine learning models; vectorisation; one or more interpolation methods; and one or more generative adversarial networks.

Since video cameras tend generate image resolutions that typically do not represent the actual resolution achievable by the image sensor of the camera, downsampling the images does not lead to losing vital data as it provides a lower resolution which better reflects the true resolution of the image sensor.

Optionally, upscaling comprises upscaling to a target resolution. This allows the training data to be generated for a specific type of video camera brand or specification and allows a computer model to be trained on the correct resolution needed to function as a video detection model for a new camera.

Optionally, the metadata comprises any one or any combination of: label data; annotations; timestamp data or one or more bounding boxes.

Generating a bounding box around a detected object can allow for a standardised way to determine movement of the same object between sequential frames, as the bounding box will be substantially the same size should the object not be moving towards or away from the image capture device, thus provides a way to determine the movement of an object between frames of video without requiring more complex segmentation of objects within each frame. Similarly, label data or annotations enable identification of artefacts or objects between sequential frames to be tracked through a period of time.

Typically, sequential image data comprises metadata that can be used to identify the order of the frames within the set of data. In the instance of using a sequence of images as a video data, sometimes frames need to be generated from the video data due to the encoding of the video data. Sequential frames can typically be identified, using the metadata that is used when displaying videos to display the correct sequence of images, and if needed the sequential frames extracted and/or re-generated from the video. Sometimes the sequential images can be images that are not strictly sequential (i.e., substantially sequential) but a number of frames apart in the sequence forming the video. If using sequential or substantially sequential images as the pair of images being considered, the similarities in the images can be determined to make the choice of which pairs of images to use.

Optionally, label data, annotations and/or bounding boxes can be added manually, or edited manually, to images by human users to ensure quality of training data. This can occur alongside automated generation of bounding boxes.

Optionally, the first, second, third or fourth sets of image data comprise video data. Further optionally, the first set of image data further comprising video data at a first frame rate; and/or the second set of image data further comprising video data at a second frame rate; and/or the third set of image data further comprising video data at a third frame rate.

Optionally, the step of downsampling comprises downsampling the first frame rate to the second frame rate. Optionally, the step of upscaling comprises upscaling the second frame rate to the third frame rate. When the sequential images are seen as video data, in some instances the frame rate for the training data also needs to be changed to cater for a video camera with a different specification.

In addition to applying the transformation in the spatial domain (i.e., downscaling/downsampling and upscaling/upsampling image resolution) the transformation can also be applied to the temporal component of video data (or sequential image frames). In some instances, for example with video data, the transformation can be applied both spatially and temporally as the resolution of video data may also need to be transformed. In this way, a lower frame rate and/or lower resolution video can be mimicked/simulated from high frame rate and/or higher resolution video to train an action recognition or detection model.

According to a further aspect, there is provided a computer program comprising instructions which, when the program is executed by a computer, cause the computer to carry out the method of any aspect and/or embodiment.

According to a further aspect, there is provided a computer-readable medium comprising instructions which, when executed by a computer, cause the computer to carry out the method of any aspect and/or embodiment.

According to a further aspect, there is provided a computer-implemented method of using a trained computer-implemented model to detect objects in one or more sequential images, wherein the computer-implemented model is trained by: receiving a first set of image data, wherein the first set of image data comprises two or more sequential images at a first resolution; receiving metadata associated with each of the sequential images of the first set of image data, wherein the metadata comprises detected object data; generating a second set of image data by downsampling each of the sequential images of the first set of image data, wherein each of downsampled images of the second set of images has a second resolution; generating a third set of image data by upscaling each of the sequential images of the second set of image data wherein each of the upscaled images has a third resolution; associating each of the sequential images of the third set of image data to the metadata associated to each of the sequential images of the first set of image data; training the computer-implemented model using the combination of the third set of image data and the associated metadata; receiving a fourth set of image data, wherein the fourth set of image data comprises two or more sequential images at the third resolution; and refining the trained computer-implemented model using the fourth set of image data.

According to a further aspect, there is provided an object detection system for image data comprising: at least one camera operable to capture a set of input image data, wherein the set of input image data comprises two or more sequential images at a third resolution; a server operable to detect objects in one or more sequential images using a trained computer-implemented model, wherein the server is further operable to generate detected object data for the set of input image data; wherein the server comprises a computer-implemented model trained by: receiving a first set of image data, wherein the first set of image data comprises two or more sequential images at a first resolution; receiving metadata associated with each of the sequential images of the first set of image data, wherein the metadata comprises detected object data; generating a second set of image data by downsampling each of the sequential images of the first set of image data, wherein each of downsampled images of the second set of images has a second resolution; generating a third set of image data by upscaling each of the sequential images of the second set of image data wherein each of the upscaled images has the third resolution; associating each of the sequential images of the third set of image data to the metadata associated to each of the sequential images of the first set of image data; training the computer-implemented model using the combination of the third set of image data and the associated metadata; receiving a fourth set of image data, wherein the fourth set of image data comprises two or more sequential images at the third resolution; and refining the trained computer-implemented model using the fourth set of image data.

BRIEF DESCRIPTION OF DRAWINGS

Embodiments will now be described, by way of example only and with reference to the accompanying drawings having like-reference numerals, in which.

SPECIFIC DESCRIPTION

Figure 1:
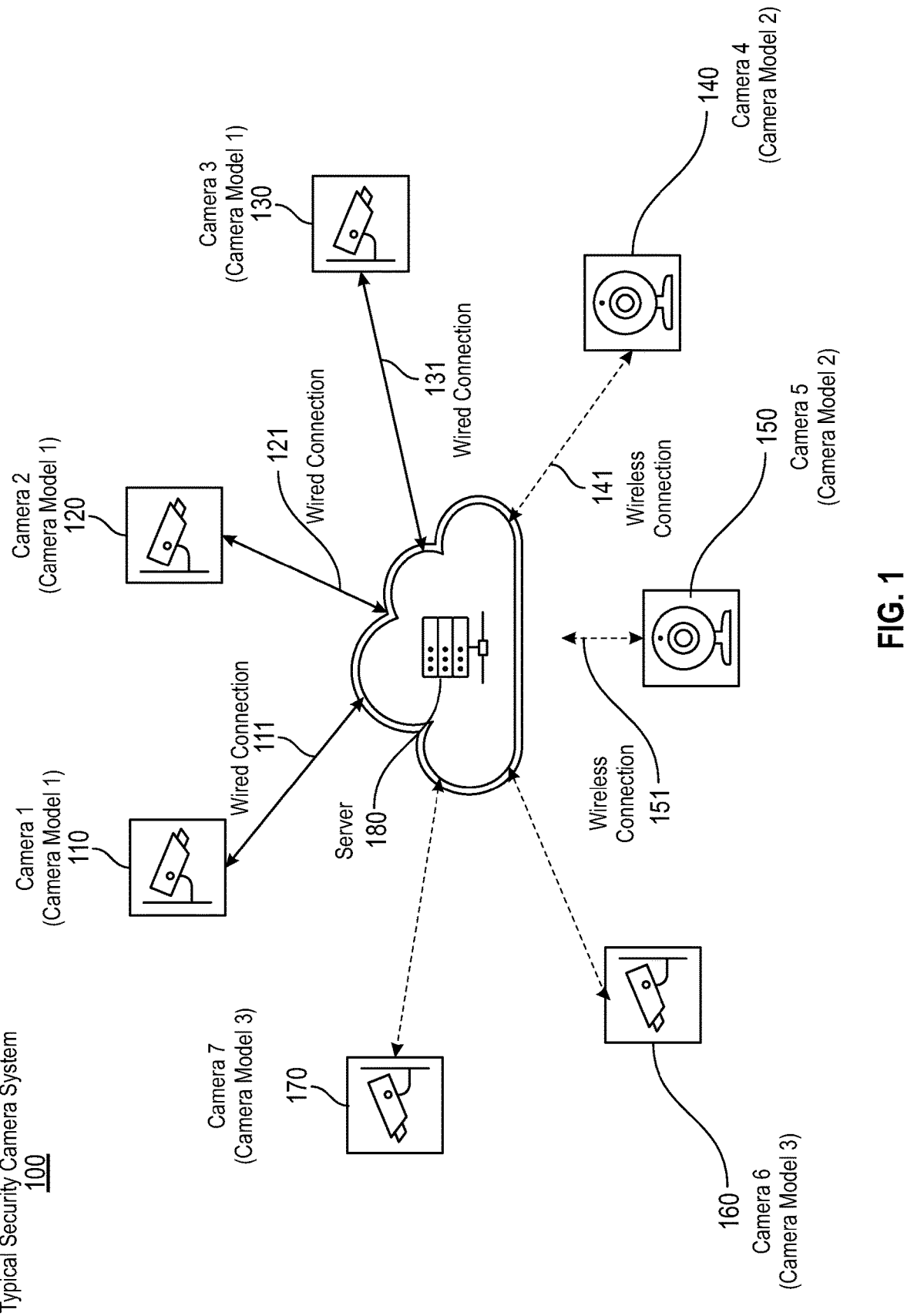
FIG. 1 shows an overview of a typical security camera system.

Referring to FIG. 1, an example of a typical video security surveillance system is shown 100, which will now be described in more detail.

Video surveillance systems usually have a number of cameras positioned around a given area to provide visual coverage of the entire area. This means cameras needs to be positioned in a number of different locations and angles to avoid camera blind spots within the area to be covered. Over time, the area needed to be covered may expand and additional cameras may need to be introduced to the system to cover the additional area. Alternatively, old video cameras may be replaced by newer video cameras with a different specification. In either scenario, video surveillance systems are likely to have video cameras with different specifications.

In FIG. 1, camera 1, 110, camera 2, 120, and camera 3, 130, are shown to be connected to a server 180 of the video surveillance system. The solid lines, 111, 121, 131, represent wired connections between the cameras and the server 180. Any known wired connection means can be used in this example. Cameras 1, 2 and 3 are of the same type and thus they have the same resolution and image quality. As a result, these cameras can use a common automated detection model, camera model 1, to process the video streams provided by these cameras.

Automated detection models are used to create alerts or alarms in a surveillance system based on movements detected in the video feeds connected to the security system. Each detection model is trained and deployed based on a measure of what is considered to be a movement that should trigger an alarm. Machine learning approaches can be used to provide more accurate alarm triggers. These models are typically trained using a set of high quality labelled image data. As an example, the training data would include labelled images from a video feed in which there is sufficient movement between frames of video that would be desired to trigger an alarm. However, the image data of the training data is typically from a single manufacturer, a certain resolution, or a specific type of camera senor and thus the use a trained model is targeted to a certain type of video camera manufacturer, camera resolution or camera sensor.

Considering the system of FIG. 1, two additional cameras, camera 4, 140, and camera 5, 150, are introduced to the system. In this instance, these cameras are connected to the server 180 wirelessly, depicted as dashed lines 141 and 151, respectively. Once again, any known methods of wireless connectivity can be used to establish a communication between the server 180 and cameras. Since these new cameras have a different specification to camera 1, camera 2 and camera 3, camera model 1 which was trained using image data to cater for the specification of cameras 1 to 3 will not be able to fulfil its function in automatically detecting motion or objects for image data received from camera 4, 140, and camera 5, 150. Therefore, in order to use an automated detection model for these new cameras, a new model needs to be trained and deployed, camera model 2. The training data for camera model 2 would need to be prepared and gathered to accommodate the specification of cameras 4 and 5.

FIG. 1 shows an additional two new cameras that are being considered to be incorporated in the system. Camera 6, 160, and camera 7, 170, are different to the other cameras already incorporated in the system and as a result, in order to use an automated detection model, a new model, camera model 3, using new training data to accommodate the specification of cameras 6 and 7 would need to be developed and deployed.

Thus, FIG. 1 illustrates the difficulties of onboarding new video cameras into an existing surveillance system which uses automated detection modules. The long and arduous process of training a new detection model is needed every time a video camera with a different specification is onboarded.

Referring to FIGS. 2 to 7, an example embodiment will now be described, and then some alternatives and further embodiments will be described.

Figure 2:
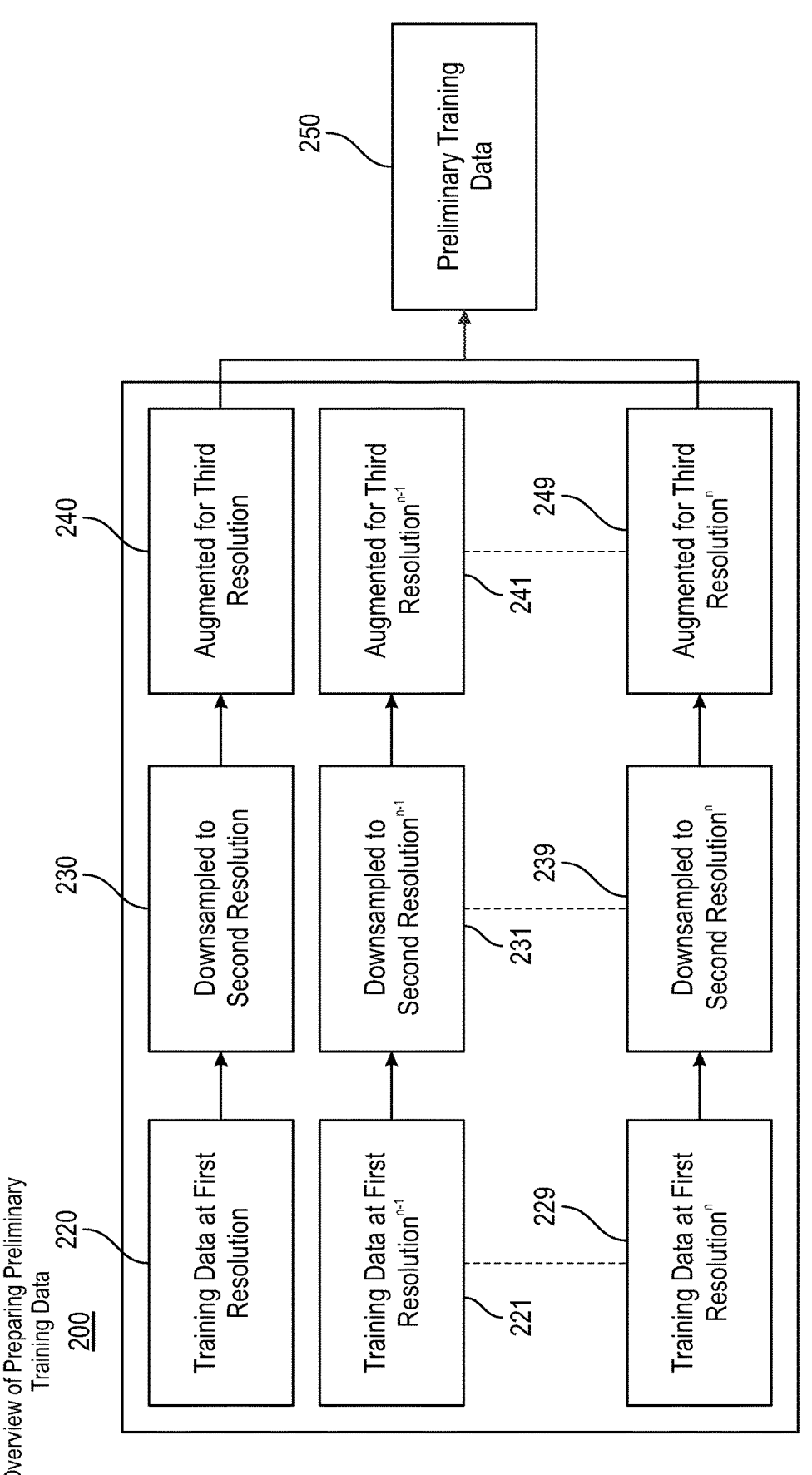
FIG. 2 shows a flowchart of preparing preliminary training data according to an embodiment.

Referring now to FIG. 2, there is shown an overview of preparing preliminary training data 200 according to an embodiment which will now be described in more detail below.

The method starts by using existing training data with sequential images for a model to be used with a camera of a first specification. In FIG. 2, although this is illustrated as training data at a first resolution 220, 221, 229, it may also be training data for a first manufacturer, image sensor, or video frame rate. This initial training dataset is assumed to already exist in good quality and has characteristics such as high image resolution or low-noise videos/image frames from high quality video cameras. The initial training dataset also includes or is accompanied by associated metadata which relates to detected artefacts in the image data. The metadata can include annotations, label data and bounding boxes which enables tracking the movement of objects between sequential image frames. With reference to FIG. 1, the initial training data used in example embodiments would be the training data used to train computer model 1.

Typically, and in examples where high quality video cameras have been in operation over a long period of time, a large set of high quality image data with associated metadata (for example, labelled data) is available. The metadata can be generated manually, semi-automatically or fully automatically, by any existing methods.

In an example embodiment, to perform false alarm filtering sufficiently, there needs to be adequate training data available for the specific type of camera. Therefore, when a new camera of a lower quality is introduced to an existing surveillance system with high quality cameras, there is usually no lower quality data available to sufficiently train and deploy a working detection model for the lower quality camera(s).

In example embodiments, rather than waiting to collect a sufficient amount of lower quality data and then go through the process of labelling image data (or any other type of pre or post processing), the higher quality labelled data which already exists is transformed into something that resembles the lower quality image data (for a new lower quality video camera). This enables a high performing solution in a shorter time period. In other words, example embodiments, mimic or simulate the required lower quality data. For example, different cameras have different quality image sensors and in this method, we are taking the images captured by the high quality sensors and transforming it so that it looks like images captured by low quality sensors.

The process of transforming the high quality image data into low quality image data is generated through downsampling and then upsampling/upscaling. Each of the high quality images of the initial training data 220, 221, 229, is downsampled to a fraction of the original resolution to generate a second set of image data with a second resolution, 230, 231, 239. When the high quality images are downsampled, some information in the original image is lost. As a result, if and/or when it is upscaled, for example, if it is upscaled back to the initial resolution, the image will appear blurry and resemble a lower quality image when compared to the original high quality image. However, although the high quality images of the initial training data are downsampled, the associated metadata is still preserved. This downsampled and lower resolution format of the image data easily allows the image data to be upscaled to a target resolution whilst preserving the content of the image data and the associated metadata.

The downsampled image data is then upscaled to a nominal resolution of a new camera, for example, the nominal resolution of a new camera to be introduced to a surveillance system. This generated third set of data, 240, 241, 249, can be considered to be augmented training data which has the properties of lower resolution data, in that it looks like lower quality images.

Now that this third set of image date is generated to accommodate the specifications of a new video camera, a computer detection model is trained using this transformed data. Known and normal training techniques can be used to train the new model.

As seen in FIG. 2, a number of image data sets can be processed and transformed simultaneously to generate image data at a required or target resolution, and the combination of these data sets (e.g., the combination of 240, 241 and 249) are then used as preliminary training data 250 for a new computer model.

With reference to FIG. 1 again, instead of having to acquire new training data for two new detection models needed for new cameras to the surveillance system, example embodiments use the transfer learning methods discussed to generate training data specific to the specifications of the new cameras by leveraging the high quality training data used to train camera model 1 (or a previous/existing model).

Figure 3:
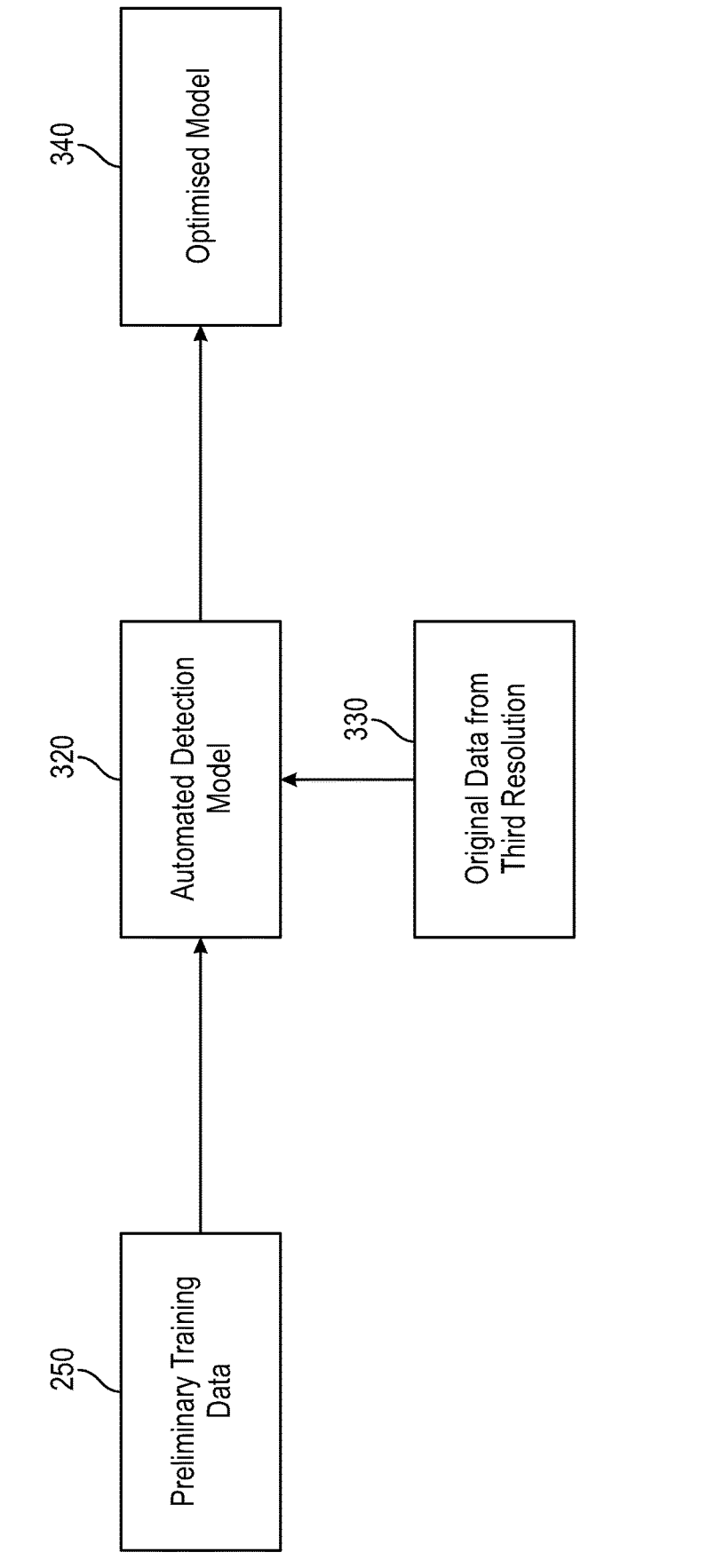
FIG. 3 shows an example of optimising a computer model trained on the preliminary training data according to an embodiment.

Referring now to FIG. 3, there is shown an example of training and optimising a computer model 300 according to an embodiment which will now be described below in more detail.

FIG. 3 illustrates the preliminary training data 250 being used to train an automated detection model 320. Once trained, although the model is capable of performing its function of video detection, since the model was initially trained on augmented data, there is still a need to test and improve the performance before the detection model is deployed into the system. This is done by optimising the model using a small sample of real world image data captured by the new camera(s). In FIG. 3, this is referred to as original data from the target third resolution 330, which is the same resolution as the generated third image data set 240, 241, 249. Once the model 320 is optimised using real world data 330, the optimised model 340 can then be deployed into security surveillance systems.

Although example embodiments refer to detection models, alternate embodiments can also be generating and training models as motion detection models, intrusion detection models and/or objection detection models.

Figure 4:
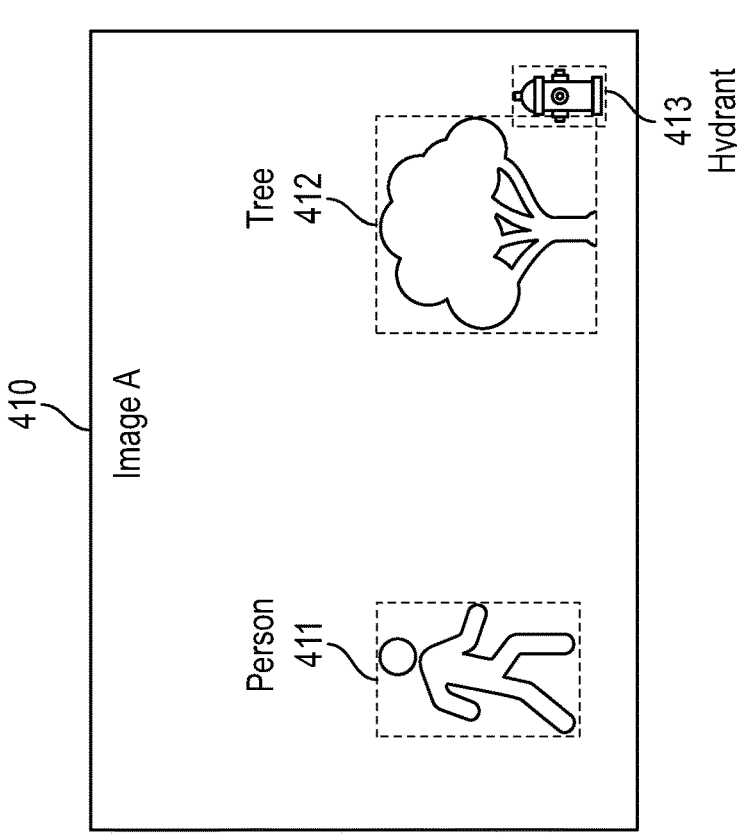
FIG. 4 shows an example of objects shown in sequential image frames with bounding boxes according to an embodiment.

Referring to FIG. 4, an example of high quality training data with objects and bounding boxes in sequential image frames 410, 420 is shown and will be described.

Sequential image data, which can also be referred to as video data when grouped together and viewed sequentially can be divided up into a plurality of sequential image frames, each of the sequential frames being paired up with at least the next sequential frame to create a plurality of paired sequential frames.

In other embodiments, different combinations of the frames of the video can be paired up, such as frames that are not sequential but which have one or more frames in between such as every other frame or every third frame. In some embodiments multiple combinations of sequential and substantially sequential frames are possible.

In some embodiments, the video is encoded in such a way that decoding into individual sequential frames is required as an intermediate step to allow easy processing of the image frames of the video.

In FIG. 4, there are two sequential images 410, 420 where the first image 410 shows an image of a scene at a first time and a second image 420 shows an image of the same scene at a later time. In both images are a person, a tree and a fire hydrant. In the figure, bounding boxes have been applied to the person 411, the tree 412 and the fire hydrant 413 in the first image 410 and then to the same objects in the second image 420, i.e., to the person 421 in a different position within the environment and to the tree 422 and fire hydrant 423 in the same positions in the environment.

Figure 5:
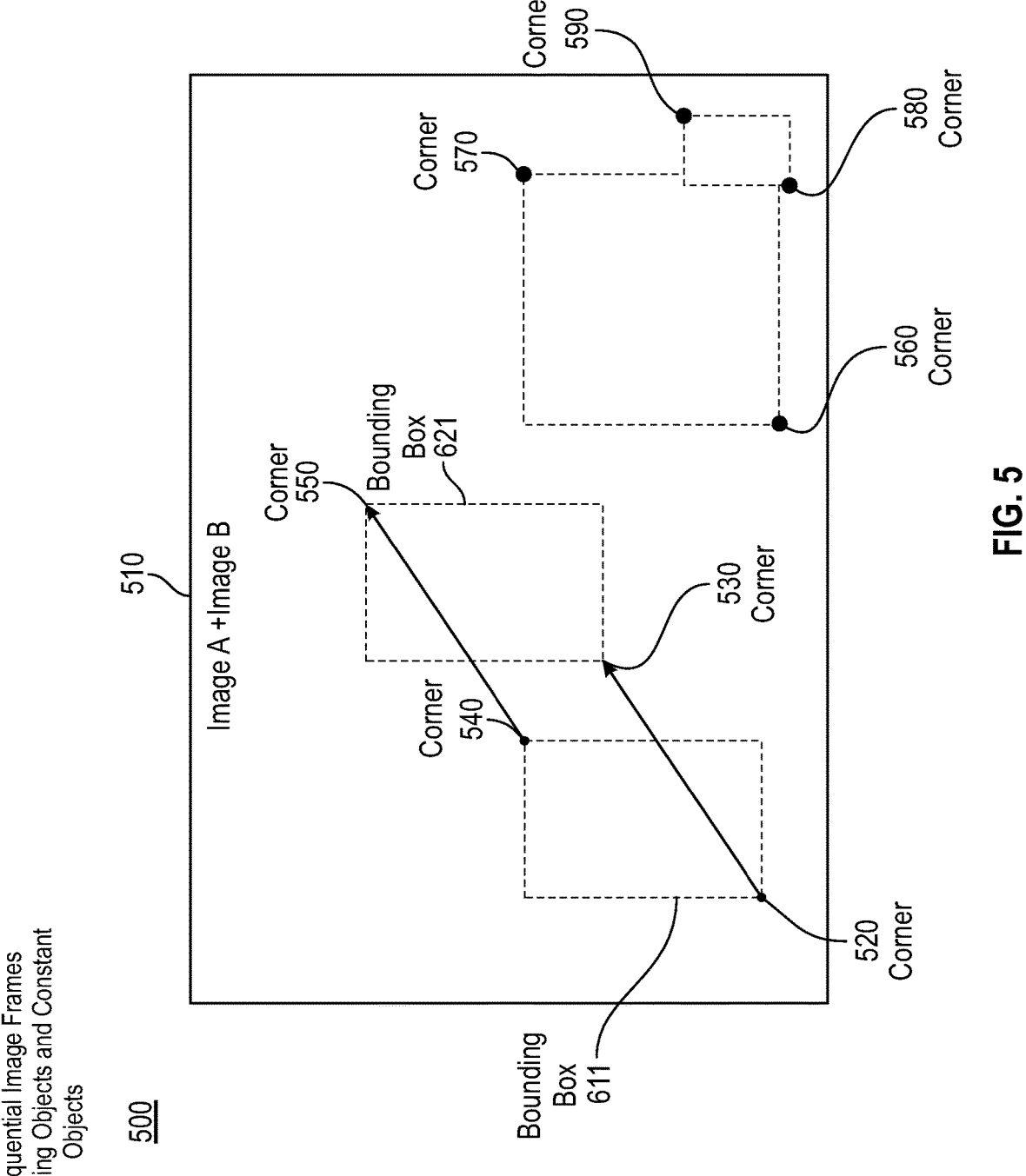
FIG. 5 shows an example of overlaid sequential image frames depicting moving objects and constant objects according to an embodiment.

Referring now to FIG. 5, an example of overlaid sequential image frames depicting bounding boxes representing detected moving and constant objects is shown and will now be described in more detail below.

The objects detected in images 410, 420 can be represented purely by bounding boxes 511, 512, 612. The bounding boxes are overlaid into a composite set 510 which allows common object bounding boxes to be associated between sequential images such as a moving bounding box 511, 521 and stationary bounding boxes 512.

FIG. 5 shows that the top right points 540, 550 of the moving object bounding boxes indicate movement between the first bounding box 511 and the second bounding box 521 and that the bottom left points 520, 530 of the moving object bounding boxes indicate movement between the first bounding box 511 and the second bounding box 521 and the movement of each corner can be calculated (both in length and in direction). In comparison, the two objects that remained constant, i.e., stationary, have bounding boxes with top right points 570, 590 and bottom left points 560, 580 that remain in the same place in both images.

For each of the paired sequential frames, a movement score is generated based on the movement detected. These movement scores are evaluated against a predetermined threshold, the predetermined threshold set to allow the identification of movement scores showing an amount of movement that should trigger an alert or alarm in a security system should such movement be observed in security video feeds. Movement scores that exceed the predetermined threshold are then output as training data.

The pre-determined threshold can, in other embodiments, be dynamic and can alternatively select the paired sequential frames having the top movement scores of all of the paired sequential frames, for example the paired sequential frames having the top 20% of movement scores can be selected as the output training data.

Figure 6:
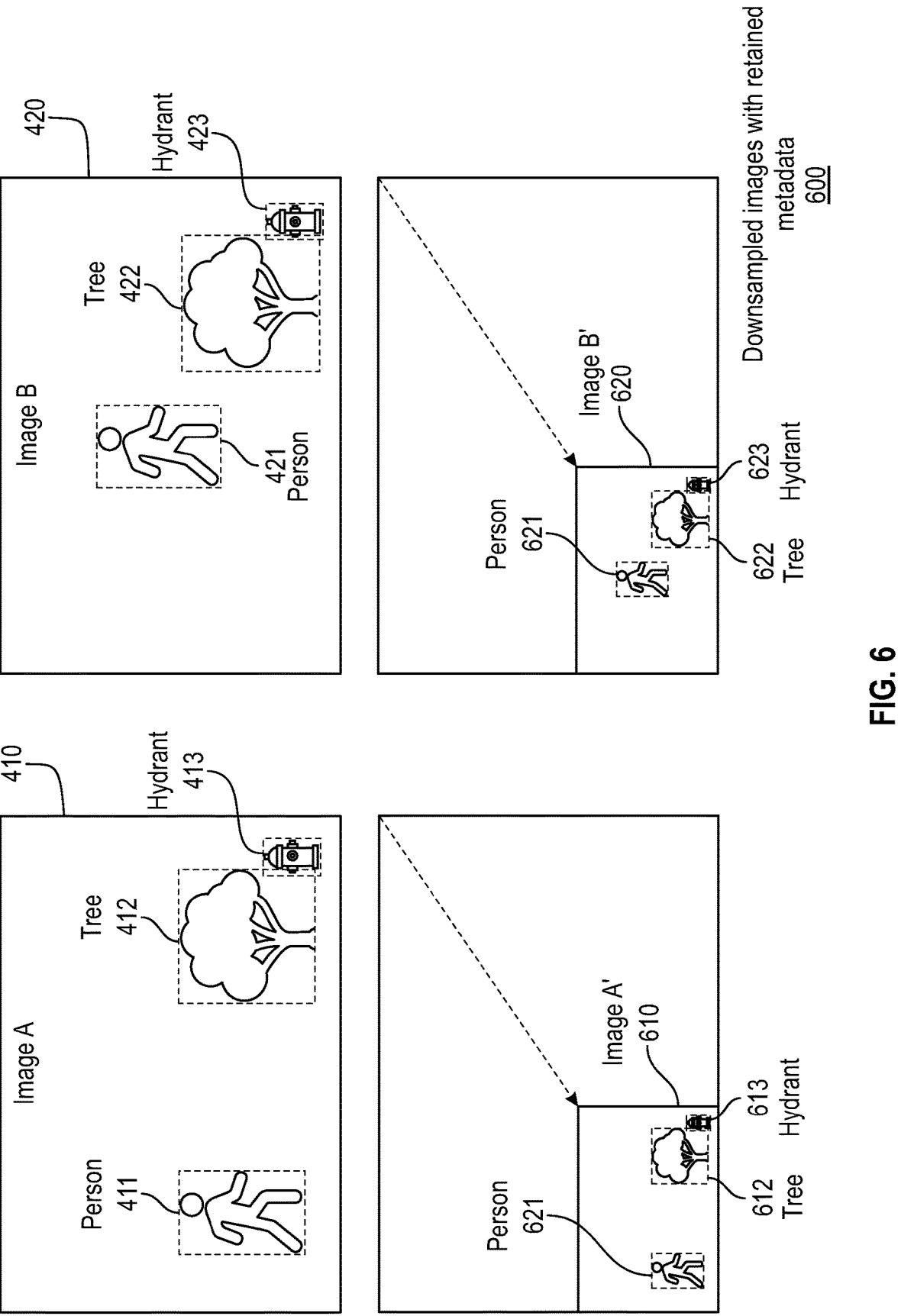
FIG. 6 shows an example of downsampling sequential image frame while retaining detected objects in bounding boxes according to an embodiment.

Referring now to FIG. 6, there is shown an example of downsampling the initial high quality input image data 600 according to an embodiment which will now be described below in more detail.

As illustrated in FIG. 6, the sequential image frames A and B, 410, 420, of FIG. 4 are taken to represent the initial high quality training data with associated metadata identifying objects within each image frame and object detection data between sequential frames. As described with reference to FIG. 2, each of the high quality images are downsampled and the associated metadata is also preserved. In FIG. 6, image A, 410, is downsampled by a fraction to generate a lower resolution image A', 610. Any known method of downsampling can be used in process, for example, using one or more machine learning models, or interpolation methods. By downsampling image A, 410, to lower resolution image A', 610, the objects within the images are also downsampled and preserved. For example, within image A', 610, there is a downsampled person and its bounding box 611, tree and its bounding box 612 and hydrant and its bounding box 613. Similarly, when image B, 420, is downsampled to image B', 620, each of the objects in the initial image frame, and its metadata, is also preserved. Within image B', 620, FIG. 6 illustrates a downsampled person and its bounding box 621, tree and its bounding box 622 and hydrant and its bounding box 623.

Figure 7:
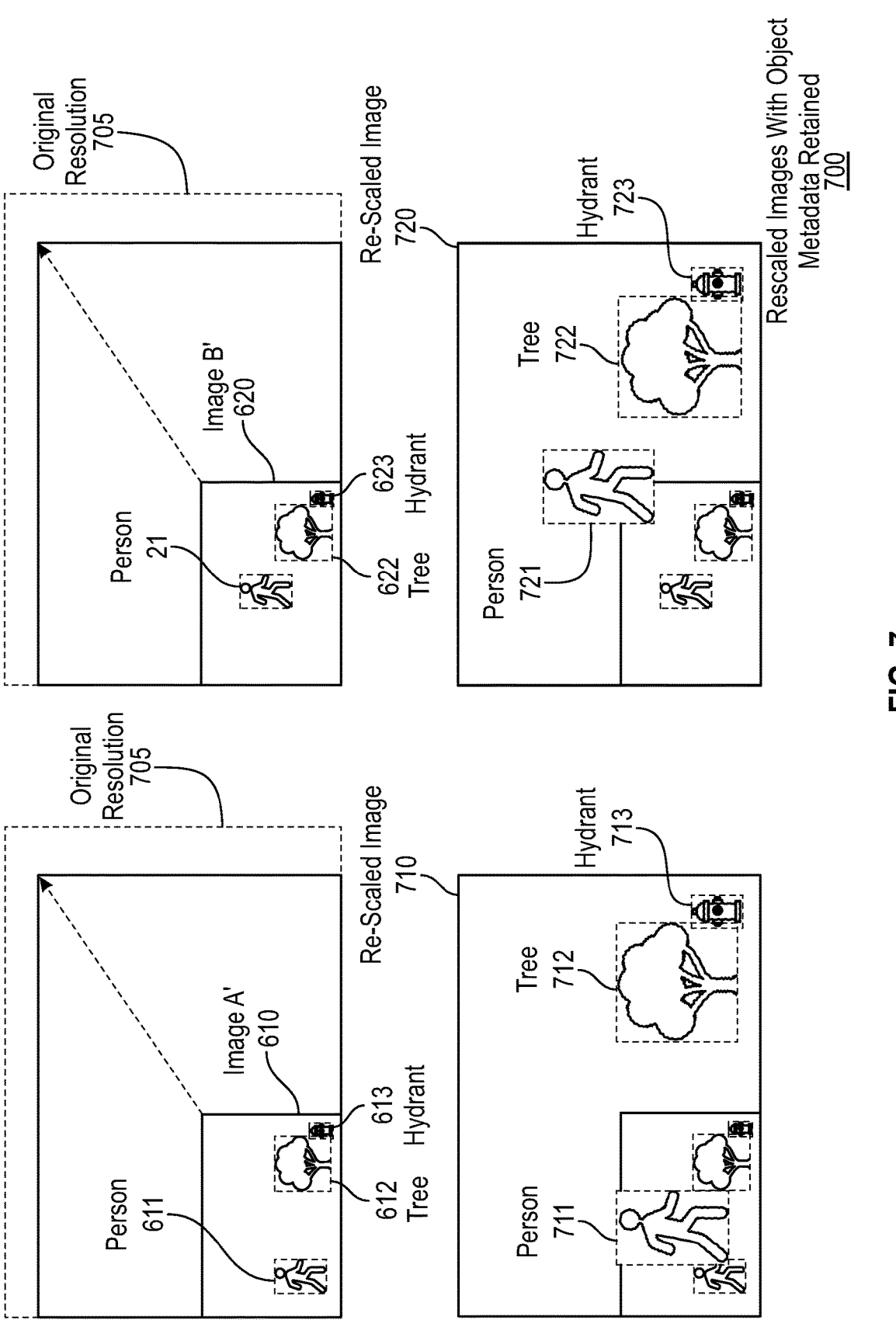
FIG. 7 shows an example of upscaling the downsampled sequential image frames while retaining detected objects in bounding boxes according to an embodiment.

Referring now to FIG. 7, there is shown an example of upscaling the second resolution image data 700 according to an embodiment which will now be described below in more detail.

Continuing with the lower resolution image frames A' and B', 610 and 620, FIG. 7 illustrates the size of these images compared to the original high quality resolution frames, as depicted by the dashed boxes of 705. FIG. 7 also shows the target resolution for each of the lower resolution imaged to be upscaled to. As with the downsampling process, any known method of upscaling images can be used in this process, for example, using one or more machine learning models, interpolation methods, or the use of generative adversarial networks (GANs).

Image A', 610, is rescaled to target resolution 710 and image B' is rescaled to target resolution 720. The target resolution is the resolution which meets the requirements or specification of new video cameras. In the upscaled image 710, there is now a rescaled person and its bounding box 711, tree and its bounding box 712 and hydrant and its bounding box 713. Similarly, in rescaled image 720, each of the objects and its metadata, is preserved. Therefore, within rescaled image 720, an upscaled person and its bounding box 721, tree and its bounding box 722 and hydrant and its bounding box 723 are shown. Notably, the objects that appear in the rescaled images are of slightly lower quality than the original high quality frames as they have been upscaled from a lower resolution. Nonetheless, the metadata, in this case in the form of bounding boxes, are still preserved.

Machine learning is the field of study where a computer or computers learn to perform classes of tasks using the feedback generated from the experience or data gathered that the machine learning process acquires during computer performance of those tasks.

Typically, machine learning can be broadly classed as using either supervised or unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets.

Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled. For unsupervised machine learning, there is a range of possible applications such as, for example, the application of computer vision techniques to image processing or video enhancement.

Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships. When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training and could also mean that the machine learning process does not converge to good solutions for all or specific examples). The user must also determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

Machine learning may be performed through the use of one or more of: a non-linear hierarchical algorithm; neural network; convolutional neural network; recurrent neural network; long short-term memory network; multi-dimensional convolutional network; a memory network; fully convolutional network or a gated recurrent network allows a flexible approach when generating the predicted block of visual data. The use of an algorithm with a memory unit such as a long short-term memory network (LSTM), a memory network or a gated recurrent network can keep the state of the predicted blocks from motion compensation processes performed on the same original input frame. The use of these networks can improve computational efficiency and also improve temporal consistency in the motion compensation process across a number of frames, as the algorithm maintains some sort of state or memory of the changes in motion. This can additionally result in a reduction of error rates.

Developing a machine learning system typically consists of two stages: (1) training and (2) production.

During the training the parameters of the machine learning model are iteratively changed to optimise a particular learning objective, known as the objective function or the loss.

Once the model is trained, it can be used in production, where the model takes in an input and produces an output using the trained parameters.

During the training stage of neural networks, verified inputs are provided, and hence it is possible to compare the neural network's calculated output to then the correct the network is need be. An error term or loss function for each node in neural network can be established, and the weights adjusted, so that future outputs are closer to an expected result. Backpropagation techniques can also be used in the training schedule for the or each neural network.

The model can be trained using backpropagation and forward pass through the network. The loss function is an objective that can be minimised, it is a measurement between the target value and the model's output.

The cross-entropy loss may be used. The cross-entropy loss is defined as $$L_{CE} = -\sum_{c=1}^{C} y * \log(s)$$

where C is the number of classes, $y \in \{0,1\}$ is the binary indicator for class c, and s is the score for class c.

In the multitask learning setting, the loss will consist of multiple parts. A loss term for each task.

$$L(x) = \lambda_1 L_1 + \lambda_2 L_2$$

where $L_1$, $L_2$ are the loss terms for two different tasks and $\lambda_1$, $\lambda_2$ are weighting terms.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A computer-implemented method for transfer learning, the method comprising:

receiving a first set of image data, wherein the first set of image data comprises two or more sequential images at a first resolution, the first set of images having been used to train a first camera detection model, the first camera detection model operating at the first resolution;

receiving metadata associated with each of the sequential images of the first set of image data, wherein the metadata comprises detected object data;

generating a second set of image data by downsampling each of the sequential images of the first set of image data, wherein each of downsampled images of the second set of images has a second resolution;

generating a third set of image data by upscaling each of the sequential images of the second set of image data wherein each of the upscaled images has a third resolution;

associating each of the sequential images of the third set of image data to the metadata associated to each of the sequential images of the first set of image data;

training a second computer-implemented model using the combination of the third set of image data and the associated metadata, wherein the second computer-implemented model is trained to detect objects in images at the third resolution;

receiving a fourth set of image data, wherein the fourth set of image data comprises two or more sequential images at the third resolution; and refining the second trained computer-implemented model using the fourth set of image data.

2. The method of claim 1 wherein the first set of image data further comprises at least one additional set of image data, wherein the at least one additional set of image data comprises: image data captured at different times; and/or image data captured at one or more different resolutions.

3. The method of claim 1 wherein downsampling comprises any one or any combination of: downsampling by a fraction; one or more machine learning models; and one or more interpolation methods.

4. The method claim 1 wherein downsampling comprises downsampling to a target resolution.

5. The method of claim 1 claim wherein upscaling comprises any one or any combination of: one or more machine learning models; one or more interpolation methods; and one or more generative adversarial networks.

6. The method of claim 1 claim wherein upscaling comprises upscaling to a target resolution.

7. The method of claim 1 wherein the metadata comprises any one or any combination of: label data; annotations; timestamp data or one or more bounding boxes.

8. The method of claim 1 wherein the first, second, third or fourth sets of image data comprise video data.

9. The method of claim 8 further comprising:

the first set of image data further comprising video data at a first frame rate; and/or the second set of image data further comprising video data at a second frame rate; and/or the third set of image data further comprising video data at a third frame rate.

10. The method of claim 9 wherein the step of downsampling comprises downsampling the first frame rate to the second frame rate.

11. The method of claim 9 wherein the step of upscaling comprises upscaling the second frame rate to the third frame rate.

12. A non-transitory computer-readable medium comprising instructions which, when executed by a computer, cause the computer to carry out the method of claim 1.

13. A computer-implemented method of using a second trained computer-implemented model to detect objects in one or more sequential images, wherein the second computer-implemented model is trained by:

receiving a first set of image data, wherein the first set of image data comprises two or more sequential images at a first resolution, the first set of images having been used to train a first camera detection model, the first camera detection model operating at the first resolution;

receiving metadata associated with each of the sequential images of the first set of image data, wherein the metadata comprises detected object data;

generating a second set of image data by downsampling each of the sequential images of the first set of image data, wherein each of downsampled images of the second set of images has a second resolution;

generating a third set of image data by upscaling each of the sequential images of the second set of image data wherein each of the upscaled images has a third resolution;

associating each of the sequential images of the third set of image data to the metadata associated to each of the sequential images of the first set of image data;

training the second computer-implemented model using the combination of the third set of image data and the associated metadata, wherein the second computer-implemented model is trained to detect objects in images at the third resolution;

receiving a fourth set of image data, wherein the fourth set of image data comprises two or more sequential images at the third resolution; and refining the second trained computer-implemented model using the fourth set of image data.

14. An object detection system for image data comprising:

at least one camera operable to capture a set of input image data, wherein the set of input image data comprises two or more sequential images at a third resolution;

a server operable to detect objects in one or more sequential images using a second trained computer-implemented model, wherein the server is further operable to generate detected object data for the set of input image data;

wherein the server comprises a computer-implemented model trained by:

receiving a first set of image data, wherein the first set of image data comprises two or more sequential images at a first resolution, the first set of images having been used to train a first camera detection model, the first camera detection model operating at the first resolution;

receiving metadata associated with each of the sequential images of the first set of image data, wherein the metadata comprises detected object data;

generating a second set of image data by downsampling each of the sequential images of the first set of image data, wherein each of downsampled images of the second set of images has a second resolution;

generating a third set of image data by upscaling each of the sequential images of the second set of image data wherein each of the upscaled images has the third resolution;

associating each of the sequential images of the third set of image data to the metadata associated to each of the sequential images of the first set of image data;

training the second computer-implemented model using the combination of the third set of image data and the associated metadata, wherein the second computer-implemented model is trained to detect objects in images at the third resolution;

receiving a fourth set of image data, wherein the fourth set of image data comprises two or more sequential images at the third resolution; and refining the second trained computer-implemented model using the fourth set of image data.

\* \* \* \* \*